July 23, 1968  N. J. FUNK ET AL  3,393,851
FACE DRIVE MECHANISM FOR FRICTION WELDERS
Filed Jan. 3, 1967  2 Sheets-Sheet 1

INVENTORS
NORMAN J. FUNK
JAMES F. JUSTICE
BY
ATTORNEYS

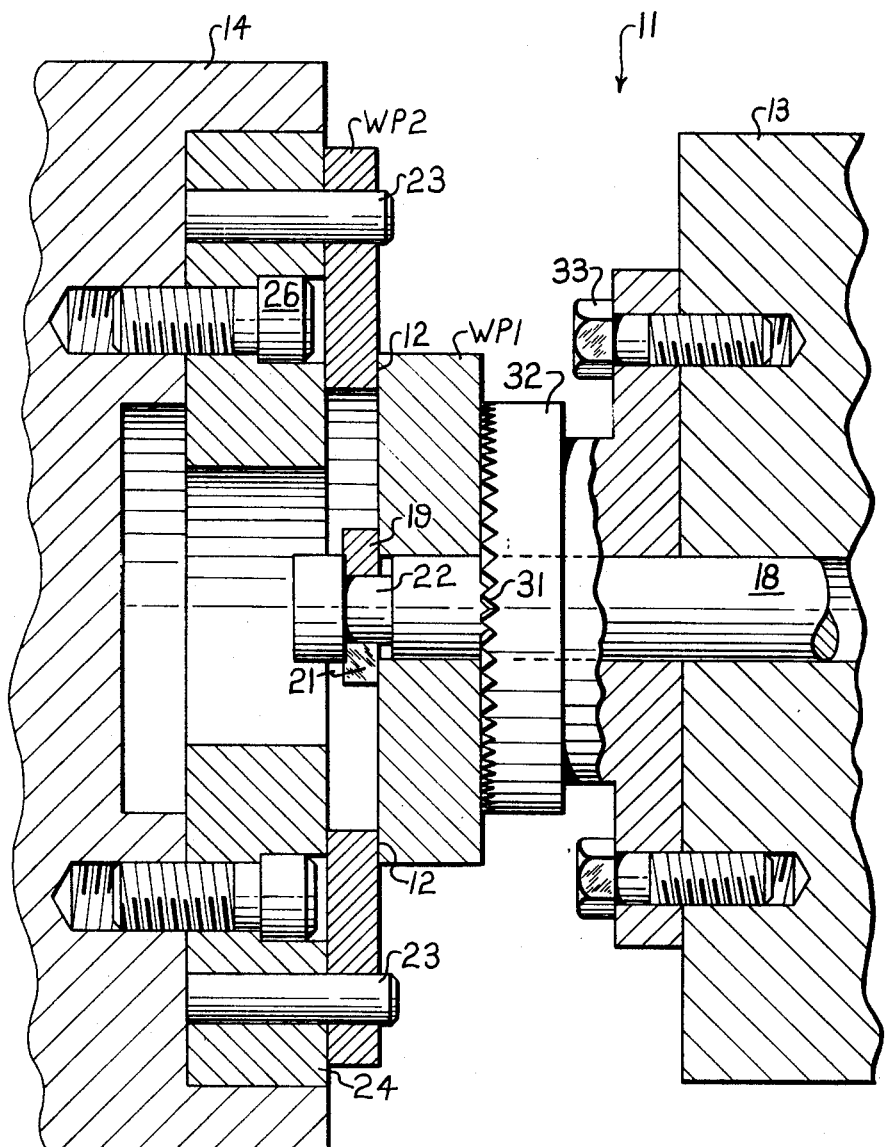

United States Patent Office 3,393,851
Patented July 23, 1968

3,393,851
FACE DRIVE MECHANISM FOR FRICTION WELDERS
Norman J. Funk, Roanoke, and James F. Justice, East Peoria, Ill., assignors to Caterpillar Tractor Co., Peoria, Ill., a corporation of California
Filed Jan. 3, 1967, Ser. No. 606,708
6 Claims. (Cl. 228—2)

ABSTRACT OF THE DISCLOSURE

Two parts to be friction welded are held in position without chucking on the outside diameters of the parts. One part is driven by sharp projections which grip into the back face of the part. The other part is held against rotation by pegs which extend through the part.

BACKGROUND OF THE INVENTION

*Field of the invention*

This invention relates to welding machines which weld parts by the friction welding process. This invention relates particularly to mechanism for holding the parts in position during the welding process.

*Description of the prior art*

In the prior art the parts to be welded have generally been held in position by chucking mechanisms which grip the parts to be welded on the outside diameters of the parts. The prior art chucking mechanisms have presented problems when it has been desired to weld parts having a configuration which makes it difficult or impossible to chuck on the outside diameter. For example, it is difficult to weld a ball joint assembly for a steering linkage with the chucking mechanisms that had been used in the prior art.

SUMMARY

It is an object of the present invention to position parts to be welded in a friction welding machine without chucking on the outside diameters of the parts. It is a specific object of the present invention to clamp one of the parts to be welded against a drive member having a plurality of sharp projections which are effective to grip into the back face of the part to provide a drive connection to that part. It is another object of the present invention to hold the other part to be welded against rotation by a plurality of pegs which extend through holes in the part to be welded. When the two parts have been welded one part slides off the pegs and the other part is quickly and easily unclamped from the machine so that the parts to be welded and the welded assembly can be readily mounted in place prior to welding and can be readily removed from the welding machine after the weld has been formed. This structure and mode of operation are further specific objects of the present invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING

FIG. 2 is a fragmentary, cross-sectional view of a face type drive constructed in accordance with another embodiment of the present invention.

DESCRIPTION OF THE PREFERRED EMBODIMENTS

Figure 1:
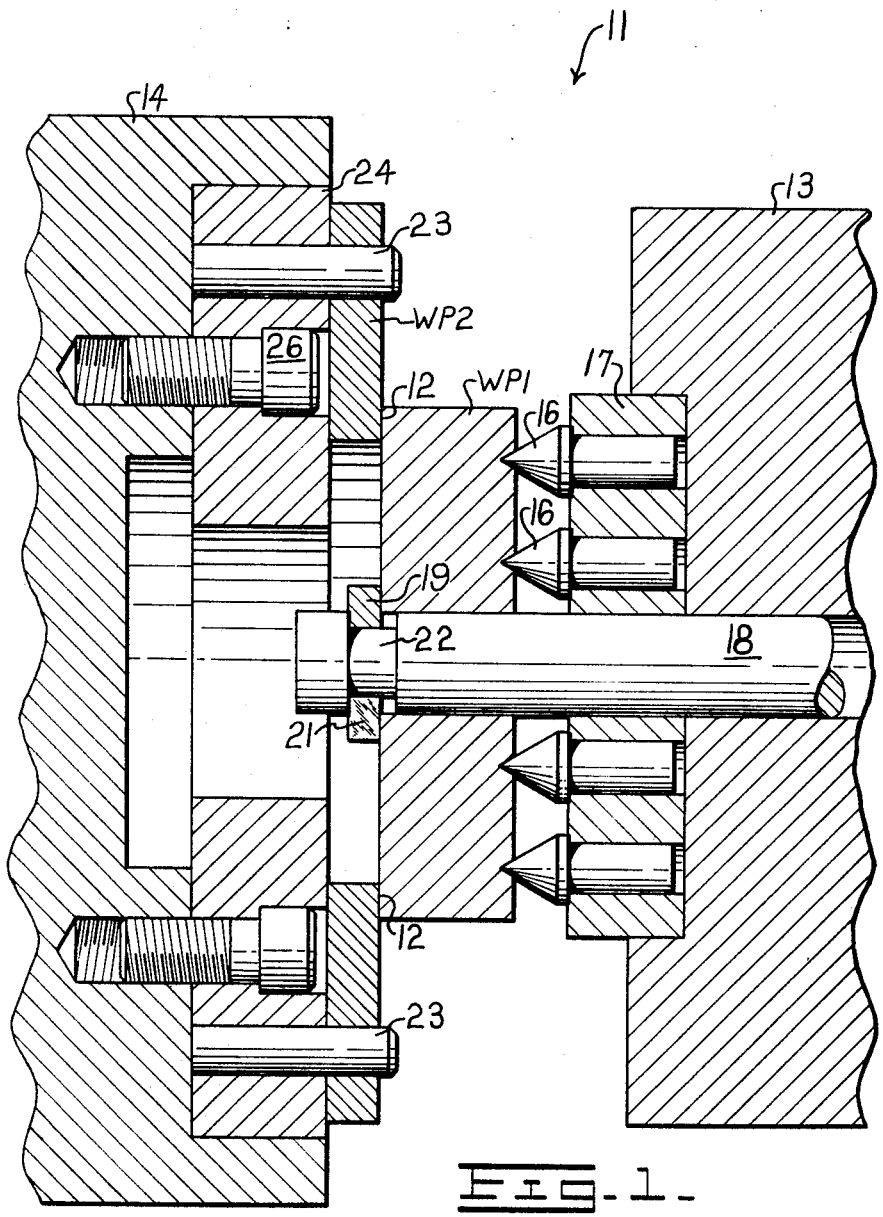
FIG. 1 is a fragmentary, cross-sectional side elevation view of a face type drive constructed in accordance with one embodiment of the present invention.

In FIG. 1 a face type drive constructed in accordance with one embodiment of the present invention is indicated generally by the reference numeral 11.

The two parts to be welded, WP1 and WP2, as shown engaged at a common interface 12. The parts are to be welded across this interface by the friction welding process. In this process the parts are pressed together under an axial load and are rotated relative to one another to heat the interface to a plastic weldable condition. Under proper process parameter—speed, pressure and time of engagement—a high strength weld is formed across the interface 12.

In the embodiment shown in FIG. 1 the part WP2 is held stationary, and the relative rotation is developed by rotating the part WP1. The energy for welding the parts may preferably be supplied from the stored energy of an inertial mass mounted for rotation with the part WP1 by means not shown in FIG. 1. This inertia process is described in U.S. Patent No. 3,273,233 of T. L. Oberle et al.

In the face drive shown in FIG. 1 the drive from the spindle 13 to the part WP1 is transmitted through a plurality of sharply pointed pins 16. The pins 16 are mounted in a pin plate 17. The pin plate is fixed for rotation with the spindle 13. The pins 16 could also be fastened to the jaw of a multi-jaw chuck so that various sizes of parts could be held simply by adjusting the chuck jaws.

A drawbar 18 extends through the center of the pin plate 17 and through the center of the part WP1. A notched circular washer 19, having a slot 21, slips over the drawbar at a section of reduced diameter indicated by the reference numeral 22. When the drawbar is pulled into the spindle 13, to the right as viewed in FIG. 1, the part WP1 is drawn up tight against the pointed pins 16. These pins then engage the back face of the part WP1 to some depth, and in this way grip into the back face to provide a positive face drive for the part WP1 without chucking on the outside circumference of the part.

The drawbar 18 can also be used to pilot or center the part WP1.

Other means for clamping the part WP1 against the drive pins 16 can be used. For example, a bolt or stud could be used in place of the drawbar 18, and a nut on the free end of the bolt or stud could be tightened against one face of the part WP1 to force the back face against the drive pins 16.

The part WP2 is held against rotation by a plurality of pegs 23 which are fastened to a plate 24. The plate 24 is in turn attached to the non-rotatable member 14 by cap screws 26.

In operation, the part WP2 is placed on the pegs 23. The part WP1 is placed on the drawbar 18, the slotted washer 19 is dropped into position and the drawbar is retracted to pull the part WP1 against the pins 16. The part WP1 is then rotated to the desired speed and the parts WP1 and WP2 are pressed together at the interface 12. The interface 12 is heated to a plastic weldable condition, and after the relative rotation has ended, the members 13 and 14 are drawn apart. This pulls the part WP2 off the pegs 23. The drawbar 18 is then unclamped, the slotted washer is removed and the welded assembly is removed over the end of the drawbar 18.

The embodiment of the face drive mechanism shown in FIG. 2 is basically like that shown in FIG. 1, and similar parts are indicated by the same reference numerals. The principal point of difference in FIG. 2 is in the type of projections that are used for the face drive of the part WP1. In the FIG. 2 form a series of serrations or machined teeth 31 grip the part WP1. The serrations 31 are machined into the circular face of the plate 32, and the plate 32 is attached to the spindle 13 by cap screws 33.

The mode of operation of the form of face drive shown in FIG. 2 is the same as that described above with reference to FIG. 1.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A face type drive for a friction welder comprising, a first drive member having a plurality of sharp projections adapted to be impressed in a back face of one part to be welded to form the drive connection to that part, and clamping means for pressing the part against the drive member with sufficient force to cause the projections to grip into the back face of the part.

2. A face type drive as defined in claim 1 wherein the clamping means include a drawbar which extends through the center of the part to be welded.

3. A face type drive as defined in claim 2 including a slotted washer which slips over the end of the drawbar to hold the part in place.

4. A face type drive as defined in claim 1 wherein the projections are pins, and the pins are mounted on a rotatable part of the welding machine.

5. A face type drive as defined in claim 1 wherein the projections are serrations and are mounted on a rotatable part of the welding machine.

6. A face type drive as defined in claim 1 including a second drive member having a plurality of pegs fixed to a non-rotatable part of the welding machine and adapted to extend through holes in the other part to be welded to hold that part against rotation whereby both parts to be welded are held in position without chucking on the outside diameters of the parts.

References Cited

UNITED STATES PATENTS 3,134,278   5/1964   Hollander _____ 228—2

RICHARD H. EANES, JR., *Primary Examiner.*